C. Schmidt,
Boring Hubs.

N° 14,434. Patented Mar. 11, 1856.

Witnesses:

Inventor:
Charles Schmidt

UNITED STATES PATENT OFFICE.

CHARLES SCHMIDT, OF UNION, MISSOURI.

METHOD OF BOXING CARRIAGE-WHEELS.

Specification of Letters Patent No. 14,434, dated March 11, 1856.

*To all whom it may concern:*

Be it known that I, CHARLES SCHMIDT, of the town of Union, county of Franklin, State of Missouri, have invented a new and useful Machine for Boxing Carriage-Wheels; and I do hereby declare that the following is a full, clear, and exact description of the construction and operation of the same, reference being had to the annexed drawings, making a part of this specification, in which—

Figure 1:
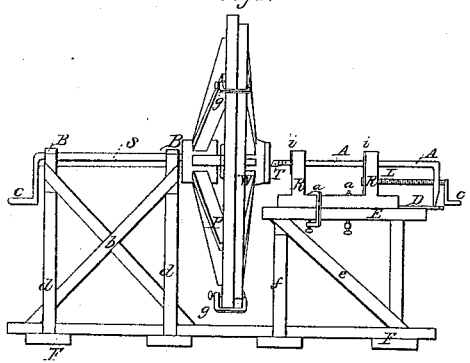
Figure 3:
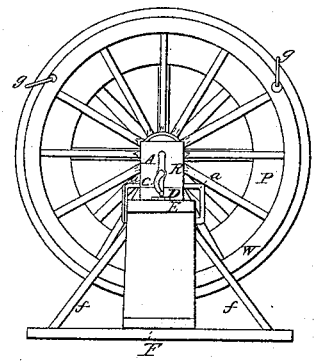
Figure 2:
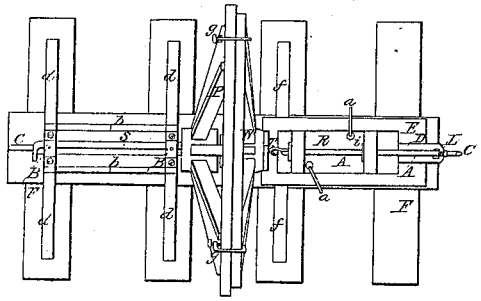
Figure 4:
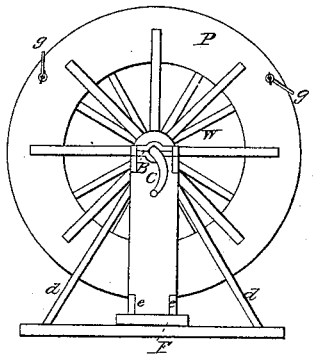

Figure 1, is a vertical view. Fig. 2, a view from above the machine or a plane view. Fig. 3, front view. Fig. 4, back view.

Letter A, the tool-shaft, B box in which the shaft runs or works, C, the crank, D, guide for the tool-shaft, E, the top of bench, F, braces, *i*, plates in which the toolshaft works, L, screw for regulating the cutting-bit in the hub, P, the revolving plate upon which the carriage wheel is fastened with clamps, R, rest for the toolshaft, S, the shaft, T, the cutting-bit, W, the carriage wheel as fastened, *a*, clamps, *e*, braces, *d*, braces, *b*, cross braces, *f*, braces.

In working the machine the carriage wheel is fastened by the clamps to the revolving wheel plate. The rest is then placed upon the bench and fastened by the clamps to the right of the center of the hub according to the size of the box. That is, if the box be large the rest is placed more to the right of the center of the hub than if the box be small. To revolving wheel or the plate upon which the carriage wheel is fastened, is then turned by a person at the large crank upon the shaft, and the bit is regulated in the hub by a person turning the small crank.

To make the hole in the hub conic so as to fit the box, the outer end of the rest (or the end of the rest next the crank) is moved to the right of its other (or inner) end. That is, the rest is placed on the bench diagonal to the hub, and as much so as required by the size of the box.

The great advantages of this machine are the exactness with which the box is fitted in the center of the hub, and the rapidity with which it is done, and the cheapness of the machine.

Two active boys, with a machine of this kind, not costing more than thirty dollars, can box in the most perfect manner one set of carriage wheels within one hour.

There are steam machines for boxing wheels, but they are too expensive for general use, and they are upon a different principle from this.

What I claim and desire to secure by Letters Patent, is—

The method of boxing carriage wheels as hereinbefore substantially described.

CHARLES SCHMIDT.

Witnesses:
   J. HALLIGAN,
   T. T VITT.